United States Patent
Nayak et al.

(10) Patent No.: US 12,405,730 B2
(45) Date of Patent: Sep. 2, 2025

(54) DATA ROUTING IN NETWORKED SSDS

(71) Applicant: SANDISK TECHNOLOGIES, INC., Milpitas, CA (US)

(72) Inventors: Dattatreya Nayak, Bangalore (IN); Narendra Bayanaboina, Bangalore (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 43 days.

(21) Appl. No.: 18/503,649

(22) Filed: Nov. 7, 2023

(65) Prior Publication Data

US 2025/0147673 A1    May 8, 2025

(51) Int. Cl.
*G06F 3/06* (2006.01)
*G06F 12/02* (2006.01)

(52) U.S. Cl.
CPC .......... *G06F 3/0619* (2013.01); *G06F 3/0647* (2013.01); *G06F 3/0679* (2013.01); *G06F 12/0253* (2013.01)

(58) Field of Classification Search
CPC .... G06F 3/0619; G06F 3/0647; G06F 3/0679; G06F 12/0246
See application file for complete search history.

(56) References Cited

U.S. PATENT DOCUMENTS

| | | | |
|---|---|---|---|
| 2017/0139839 A1* | 5/2017 | Ke | G06F 12/1009 |
| 2017/0357589 A1* | 12/2017 | Izawa | G06F 3/061 |
| 2018/0232314 A1* | 8/2018 | Lin | G06F 3/06 |
| 2018/0342261 A1* | 11/2018 | Das | G11B 5/09 |
| 2021/0081316 A1* | 3/2021 | Muthiah | G06F 3/0673 |
| 2022/0083266 A1* | 3/2022 | Prakash | G06F 3/0679 |
| 2022/0091775 A1* | 3/2022 | Shridhar | G06F 3/0659 |
| 2022/0147480 A1* | 5/2022 | Guo | G06F 12/0246 |
| 2022/0238145 A1* | 7/2022 | Rao | G11C 7/1078 |
| 2022/0308769 A1* | 9/2022 | Muthiah | G06F 12/0246 |
| 2022/0310174 A1* | 9/2022 | Deng | G11C 16/24 |
| 2023/0069861 A1* | 3/2023 | Shimada | G06F 3/067 |
| 2023/0140773 A1* | 5/2023 | Raju | G06F 3/064 711/154 |
| 2023/0418490 A1 | 12/2023 | Muthiah et al. | |

* cited by examiner

*Primary Examiner* — Tasnima Matin
(74) *Attorney, Agent, or Firm* — PATTERSON + SHERIDAN, LLP (57) ABSTRACT

Instead of all the NAND memory having asynchronous independent plane read (AIPR) enabled, a system utilizes a master-SSD to route data to multiple client SSDs via a controller memory buffer (CMB) according to the underlying NAND hardware (HW) of each of the client SSDs. The master-SSD will also analyze the application data retrieval of the logical data that is to be routed. The system comprises SSDs with AIPR NAND circuitry and SSDs with non-AIPR NAND circuitry. The system further comprises the master-SSD that will route data to any of the SSDs in the system based on the data retrieval type (sequential or random). Each of the SSDs can be of a different type beyond the NAND chip, such as HW IPs or specific firmware (FW) that is tuned towards specific data routing and retrieval requirements.

17 Claims, 6 Drawing Sheets

DATA ROUTING IN NETWORKED SSDS

BACKGROUND OF THE DISCLOSURE

Field of the Disclosure

Embodiments of the present disclosure generally relate to improving processing of commands based on data retrieval types.

Description of the Related Art

Different solid state drives (SSD) have different features that enable higher quality of service (QOS) for certain workloads. For example, asynchronous independent plane read (AIPR) is a memory (e.g., NAND memory) feature which allows senses from different word lines (WLs) on different planes of the same die. An SSD with such NAND chips would perform better with random workloads.

Proven to be useful to target random read performance, AIPR is embedded into the memory design circuitry, which is an additional cost since products that utilize this memory might or might not utilize the AIPR feature. NAND cost accounts for a significant chunk in the product cost.

SSDs invest in hardware (HW) IP to maximize performances. For example, SSDs can have HW IP such as Group Address Translation (GAT) Delta Search and Eviction (GDSE) to perform logical-to-physical (L2P) searches efficiently in firmware (FW) delta cache as well for efficient L2P consolidation, which improves random write performance. GDSE is a HW engine that is used to do a first level search of L2P entries in the RAM (cache), thereby assisting the GAT module. The engine also does pre-work to flush some of the entries into the NAND. The L2P is also known as GAT.

Likewise, some SSDs can invest more in static random access memory (SRAM) for increased read look ahead (RLA) feature to enhance sequential read performances. In short, SSDs may be a naturally good fit for certain workloads owing to the HW IPs or FW handling in them. Given the dynamics of the users of storage devices, some data may be stored/retrieved randomly, whereas some data may be stored/retrieved sequentially.

Shipping or manufacturing all the NAND memory with AIPR enabled is costly because the option to utilize AIPR feature is with the product use case, but the HW cost has already occurred and is thus a sunk cost.

There is a need in the art for improving HW costs through selectively routing data.

SUMMARY OF THE DISCLOSURE

Instead of all the NAND memory having asynchronous independent plane read (AIPR) enabled, a system utilizes a master-SSD to route data to multiple client SSDs via a controller memory buffer (CMB) according to the underlying NAND hardware (HW) of each of the client SSDs. The master-SSD will also analyze the application data retrieval of the logical data that is to be routed. The system comprises SSDs with AIPR NAND circuitry and SSDs with non-AIPR NAND circuitry. The system further comprises the master-SSD that will route data to any of the SSDs in the system based on the data retrieval type (sequential or random). Each of the SSDs can be of a different type beyond the NAND chip, such as HW IPs or specific firmware (FW) that is tuned towards specific data routing and retrieval requirements.

In one embodiment, a data storage device comprises: a memory device, wherein the memory device has a first location for storing data expected to be randomly read and a second location for storing data expected to be sequentially read; and a controller coupled to the memory device, wherein the controller is configured to: receive a command to write data to the memory device; classify the data based upon whether the data is expected to be sequentially read or randomly read; and write the data to the memory device in either the first location or the second location based upon the classification.

In another embodiment, a data storage device comprises: a first solid state drive (SSD) having a controller; a second SSD coupled to the first SSD, wherein the second SSD comprises asynchronous independent plane read (AIPR) circuitry; and a third SSD coupled to the first SSD, wherein the third SSD does not include AIPR circuitry, and wherein the controller is configured to route data to the second SSD and the third SSD based upon a determination of whether the data will be sequentially read or randomly read.

In another embodiment, a data storage device comprises: means to store data; and a controller coupled to the means to store data, wherein the configured to: determine whether data to be written to the means to store data will be sequentially read or randomly read; write the data to the means to store data in a location based upon the determining; determine that the data is improperly located based upon read characteristics; and relocate the data within the means to store data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of all the NAND memory having asynchronous independent plane read (AIPR) enabled, a system utilizes a master-SSD to route data to multiple client SSDs via a controller memory buffer (CMB) according to the underlying NAND hardware (HW) of each of the client SSDs. The master-SSD will also analyze the application data retrieval of the logical data that is to be routed. The system comprises SSDs with AIPR NAND circuitry and SSDs with non-AIPR NAND circuitry. The system further comprises the master-SSD that will route data to any of the SSDs in the system based on the data retrieval type (sequential or random). Each of the SSDs can be of a different type beyond the NAND chip, such as HW IPs or specific firmware (FW) that is tuned towards specific data routing and retrieval requirements.

Figure 1:
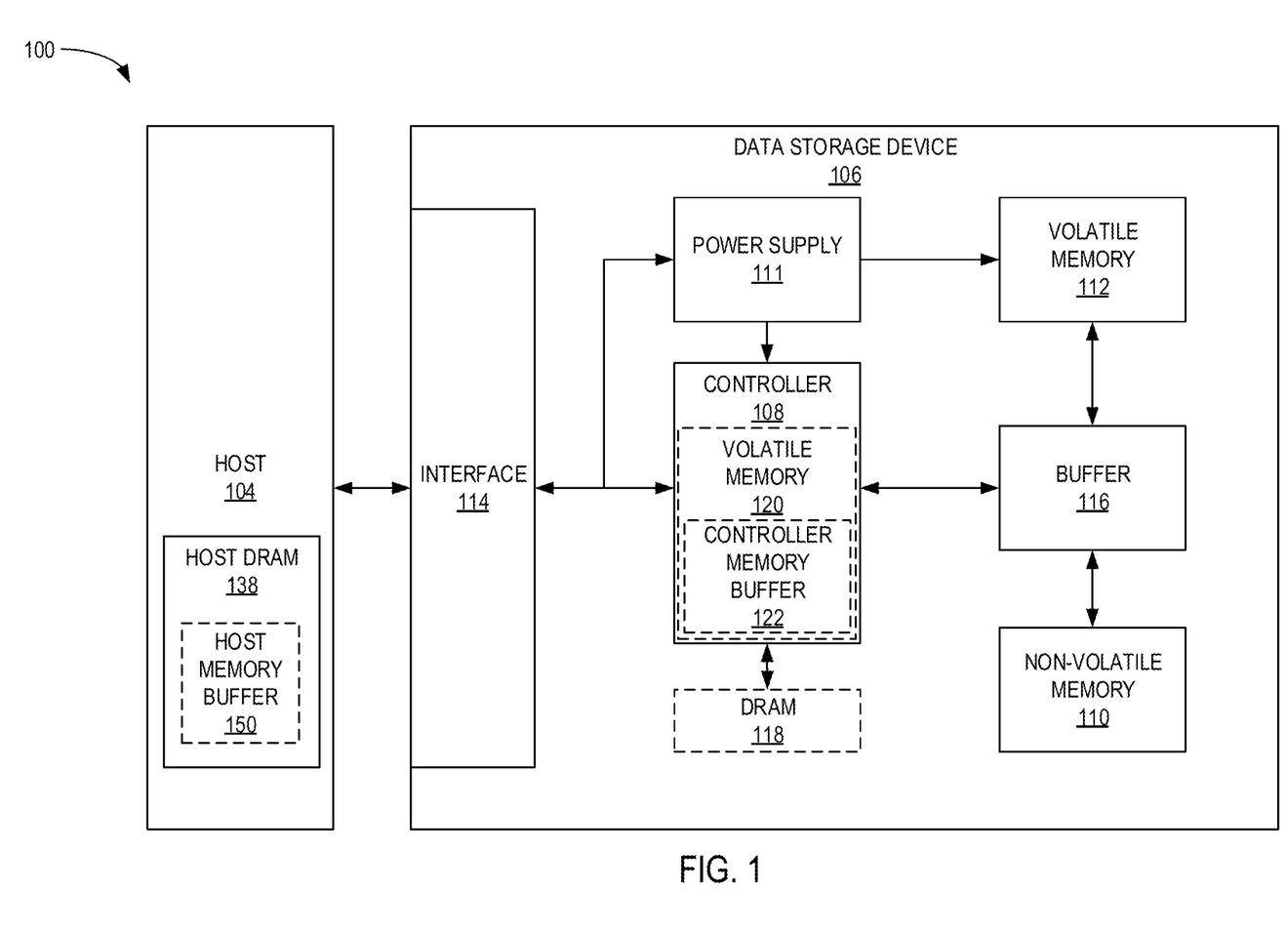
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

As will be discussed herein, one SSD (i.e., a master SSD) abstracts other SSDs (i.e., client SSDs) where the master SSD routes data to multiple client SSDs via a controller memory buffer (CMB) according to the underlying memory device (e.g., NAND) HW of each of the clients as well as the application data retrieval requirement of the logical data that is to be routed. If the master SSD determines that the application requirement is random read intensive, then the master SSD can route the data to a client SSD that has HW capable of efficient random reads. For example, backend memory devices with AIPR memory that can read asynchronously at the plane level may be sufficient. Similarly, if the master SSD determines that the data would read sequentially, the master SSD can route to another SSD that has better read look ahead (RLA) capabilities necessary for sequential reads but not necessarily specific HW to perform efficient random retrievals.

Likewise, multiple SSDs having different read and optionally write capabilities can be attached to a master SSD in a networked storage system. The master SSD makes decisions on what data should be routed to which SSD based on the application usages as well as the quality of service (QOS) ability of the individual SSDs for a given workload. In one embodiment, the client SSDs may share the configuration metadata associated with various workload QoS to the master SD to enable the master to make better decisions.

In another embodiment, the SSD controller can do the same evaluation of the application requirements verses the memory device types in a system where the SSD is associated with many types of memory devices so that the controller can route the data to one of the memory devices (i.e., AIPR vs. non-AIPR) based on the read requirement of the data. In such a system, there is one SSD that handles its own workload.

As will be discussed herein, the system comprises SSDs with AIPR memory devices and SSDs with non-AIPR memory devices for example. In the system, each of the SSDs could be of a different type beyond a NAND chip, such as HW IPs or specific FW that is tuned towards specific data routing and retrieval requirements.

Figure 2:
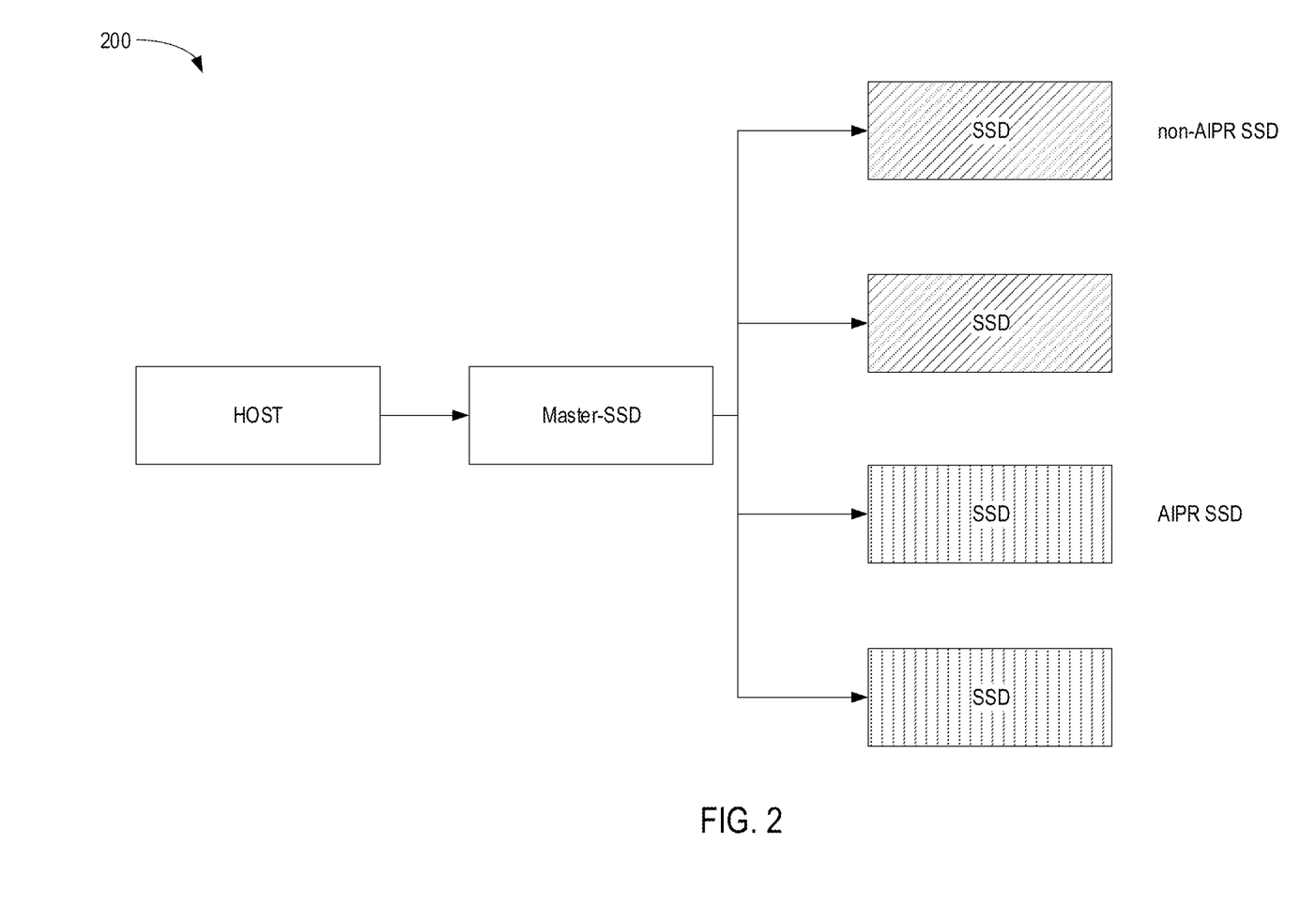
FIG. 2 is a block diagram illustrating a system that comprises SSDs with AIPR NAND and SSDs with non-AIPR NAND, according to certain embodiments.

FIG. 2 is a block diagram illustrating a system 200 that comprises SSDs with AIPR NAND and SSDs with non-AIPR NAND, according to certain embodiments. One SSD acts as a master SSD/orchestrator SSD and is connected to remaining SSDs in the system (a networked SSD system). The system 200 comprises a host connected to the master-SSD. The master-SSD is connected to the host and is visible to the host. The system 200 further comprises a plurality of SSDs with different circuitry. The system 200 comprises one or more (two illustrated) AIPR-SSD with AIPR enabled NAND circuitry and one or more (two illustrated) non-AIPR-SSD without AIPR enabled NAND circuitry.

The logic within the master-SSD considers the current data retrieval types of the host. The data retrieval types can be sequential or random based on how data was programmed in the flash. In the new approach, the master-SSD will analyze which data set and/or workload is going to benefit from the AIPR circuitry and will route such data to AIPR-SSDs groups to maximize the value out of invested HW. This will not change the host view of the system 200 since the host would still see a flat logical block address (LBA) space.

The presence of AIPR circuitry is an additional cost to a SSD, and hence the master SSD uses the AIPR SSD for storage only when the master SSD determines that it can obtain the value out of usage of the AIPR SSD. In other words, the AIPR SSD is used when the master SSD determines that the data would be retrieves randomly. The value is in the terms of performance wherein multiple asynchronous plane reads can be performed simultaneously from multiple planes during data retrieval. On similar lines, when the master SSD logic determines that the data would be retrieved sequentially, the master SSD routes such logical data to logical blocks comprising normal or non-AIPR SSD circuitry.

Figure 3:
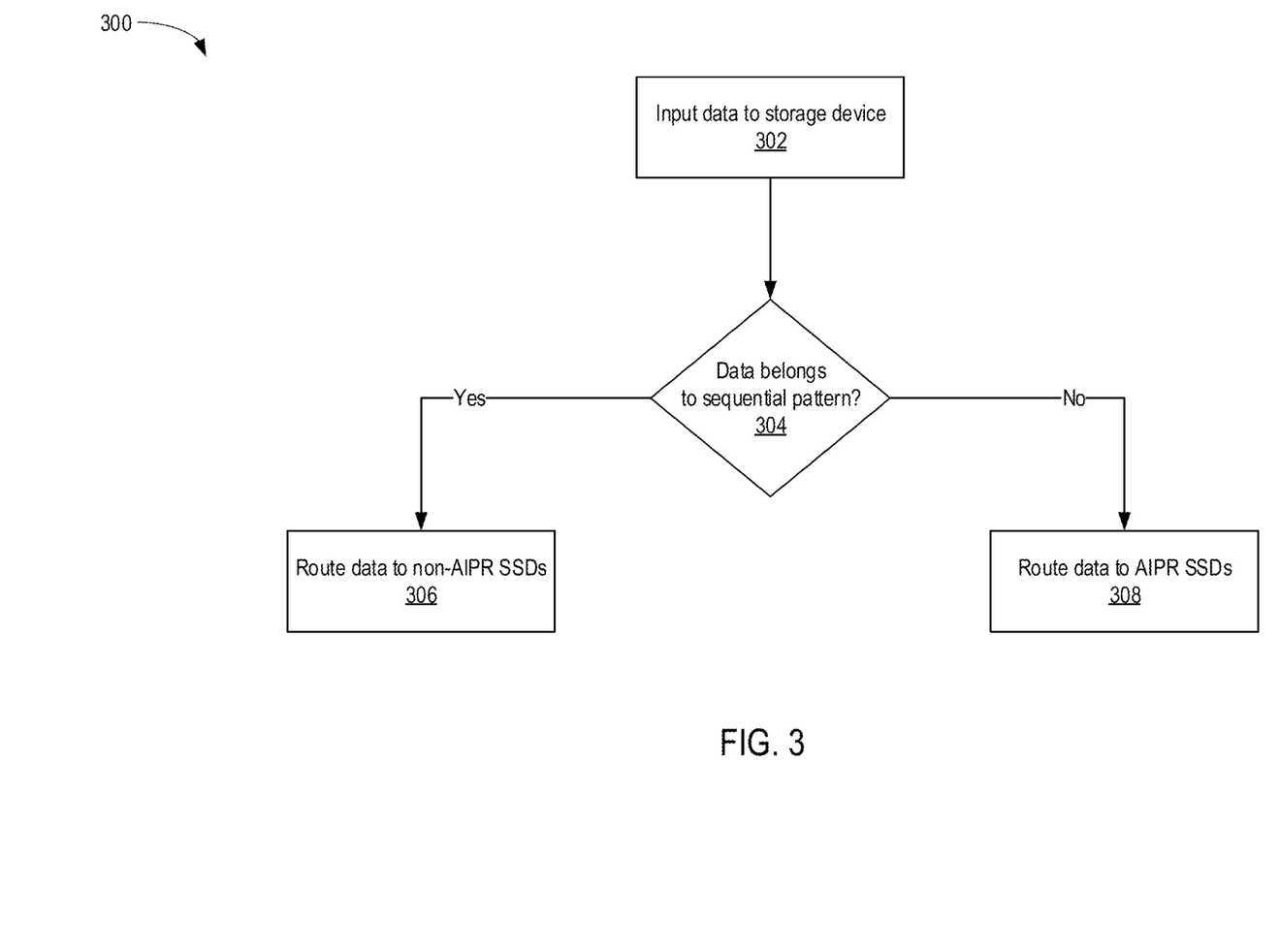
FIG. 3 is a flowchart illustrating a method for routing data to either a AIPR SSD or a non-AIPR SSD, according to certain embodiments.

FIG. 3 is a flowchart illustrating a method 300 for routing data to either an AIPR SSD or a non-AIPR SSD, according to certain embodiments. The new approach enables cost optimization.

The method 300 begins at block 302. At block 302, the controller inputs data into the storage device. At block 304, the controller determines whether the data belongs to a sequential pattern. If the controller determines that the data belongs to a sequential pattern, then the method 300 proceeds to block 306. At block 306, the controller routes data to non-AIPR SSDs. If the controller determines that the data does not belong to a sequential pattern, then the method 300 proceeds to block 308. At block 308, the controller routes the data to AIPR SSDs.

The master SSD can proactively determine data retrieval type from at least one of the following parameters: application namespace, host provided stream identifier information (i.e., stream id to data type mapping), different submission queues, an explicit hint from the host, and/or decide side data parsing mechanism such as parsing data from media or gaming workloads.

Figure 4:
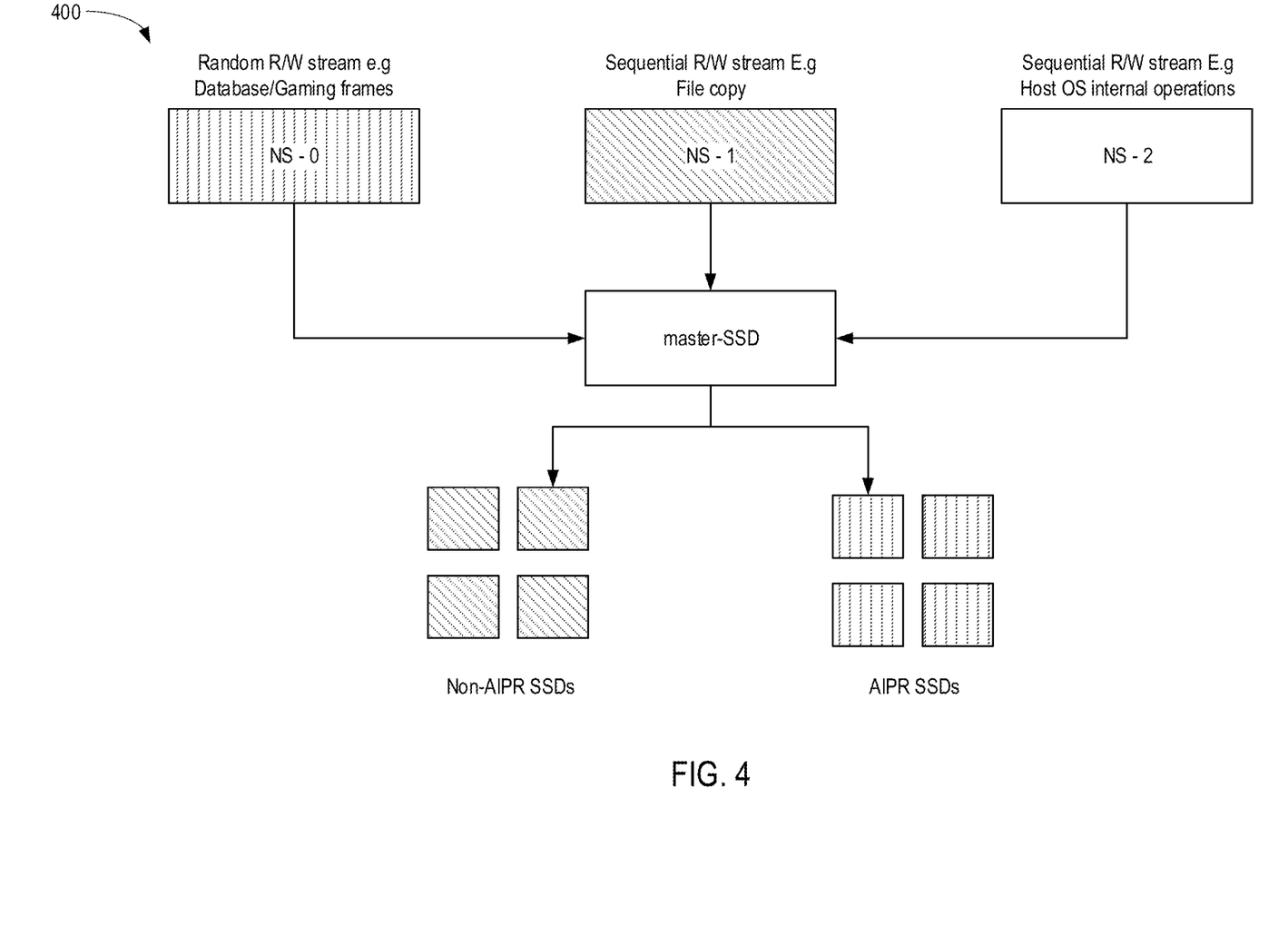
FIG. 4 is a block diagram illustrating a system for a master-SSD proactively determining data retrieval type, according to certain embodiments.

FIG. 4 is a block diagram illustrating a system 400 for a master-SSD proactively determining data retrieval type, according to certain embodiments. The system 400 comprises a namespace-0 (NS), NS-1, and NS-2. Each of the NSs is connected to a master-SSD. The NS-0 handles random read/writes streams (database/gaming frames). The NS-1 handles sequential read/writes streams (file copy). The NS-2 handles sequential read/write steams (host operating system internal operations). The master-SSD is further connected to non-AIPR SSDs and AIPR SSDs.

The master-SSD can proactively determine data retrieval type from at least one of the following parameters which include application NS. There are certain NSs attached to certain processes running from the host. If a random workload is running a particular NS. The NS will have an ID associated with an LBA. NS is typically a logical region, and hence is associated to applications. The L2P takes care of logical to NAND physical address mapping. Based on the ID of the NS, the master-SSD can determine if the data is sequential or random. The host can provided stream identifier information (Stream id to data type mapping) along with the data. Different submission queues and the system 4000 can support up to 64K submission queues. A particular workload is associated with a certain queue. An explicit host hint, or device side data parsing mechanisms (such as parsing data from media, gaming workloads).

For example, if the master-SSD parses and determines that the stored host data is video/media (parsing transport header of data such as from surveillance), a fair indication will be that the data will be accessed in sequential order only. On similar lines, if the data is stored randomly, the master-SSD knows with certainty that the data will be retrieved in a random fashion.

In situations, where the master-SSD determines that the data is programmed in sequential order, but potentially can be accessed in random order (such as from gaming workload), the master-SSD decides to err on the worst-case side. Leading to storing such data in SSDs with AIPR circuitry.

The system 400 can put in place a design to refine such decisions based on product requirements. Further, a system design can also be put in place to refine such decisions dynamically based on learning in the device. The system 400 can then modify destination options during legacy garbage collection (GC), word line (WL), or other known relocation triggers. Having the system 400 flexibility to err on the worst-case side is an option that the master-SSD can leverage to cut the cost through usage of at least some memory chips which does not have AIPR logic within.

The concept can be applied to NVMe devices. The device can associate some of the NSs to AIPR NAND and others to non-AIPR NAND. To accomplish this, the flash transition layer (FTL) would create logical blocks as AIPR and non-AIPR using physical blocks with and without AIPR circuitry correspondingly, and further use/budget those blocks for different NSs.

In another embodiment, an SSD's controller can do the same evaluation of application requirements versus NAND chip types, in a system 400 where the SSD is associated to many types of controller operated NAND chips. The controller can route the data to one of the controller operated NAND chips (AIPR and non-AIPR) based on the read requirement of the data. In the system 400, there is one SSD that handles the workload of the one SSD.

Figure 5:
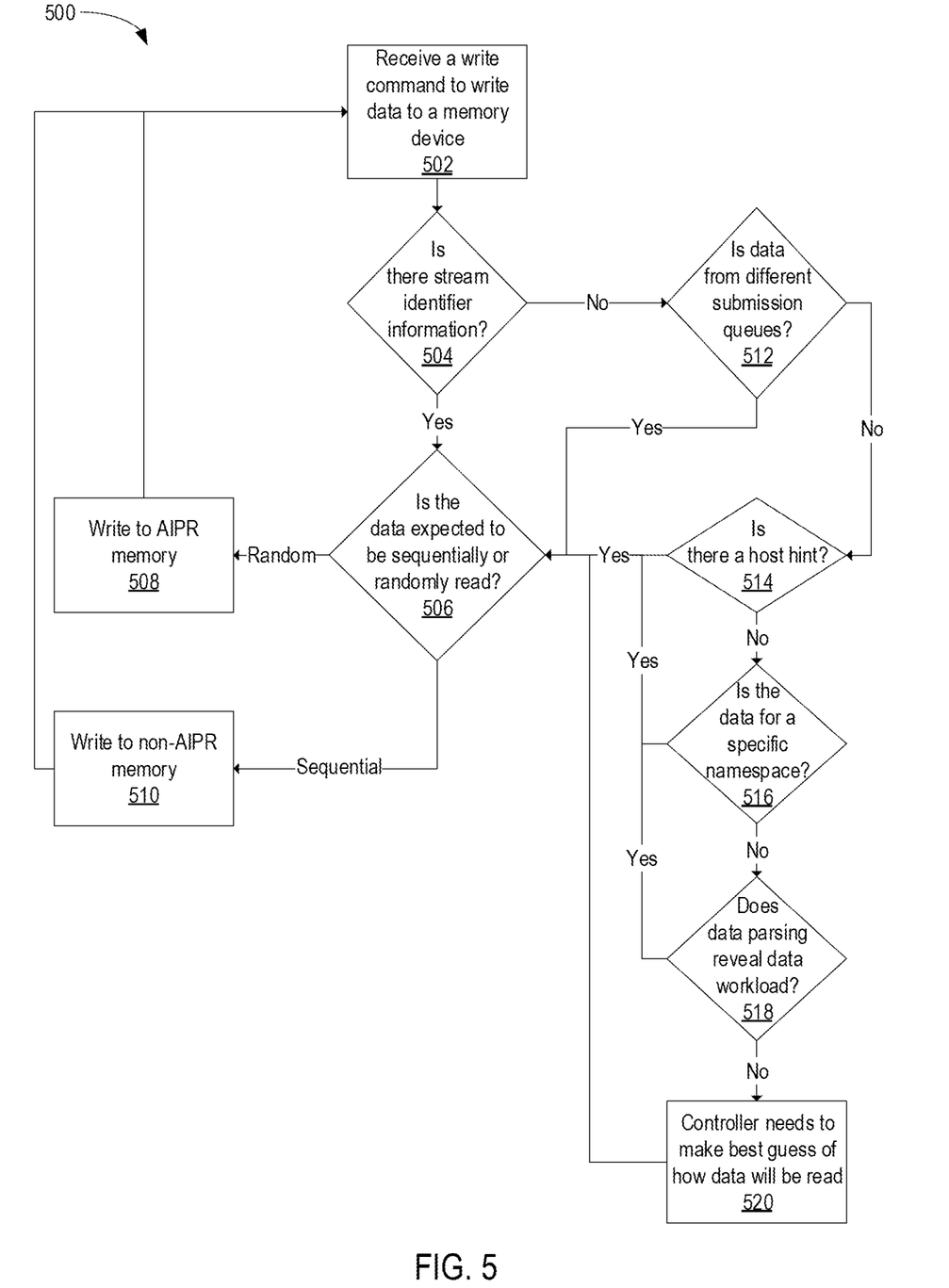
FIG. 5 is a flowchart illustrating a method for writing data either to AIPR memory or non-AIPR memory, according to certain embodiments.

FIG. 5 is a flowchart illustrating a method 500 for writing data either to AIPR memory or non-AIPR memory, according to certain embodiments. The method 500 begins at block 502. At block 502, the controller receives a write command to write data to a memory device. At block 504, the controller determines whether there is stream identifier information. If the controller determines that there is stream identifier information, then the method 500 proceeds to block 506. At block 506, the controller determines whether the data expected to be sequentially read or randomly read. If the controller determines that the data is to be randomly read, then the method 500 proceeds to block 508. At block 508, the controller writes the data to AIPR memory. If the controller determines that the data is to be sequentially read, then the method 500 proceeds to block 510. At block 510, the controller write data to non-AIPR memory.

If the controller determines that there is no stream identifier information, then the method 500 proceeds to block 512. At block 512, the controller determines whether the data is from different submission queues. If the controller determines that the data is from different submission queues, then the method 500 returns to block 506. If the controller determines that the data is not from different submission queues, then the method 500 proceeds to block 514. At block 514, the controller determines whether there is a host hint. If the controller determines that there is a host hint, then the method 500 returns to block 506. If the controller determines that there is no host hint, then the method 500 proceeds to block 516. At block 516, the controller determines whether the data is for a specific namespace. If the controller determines that the data is for a specific namespace, then the method 500 returns to block 506. If the controller determines that the data is not for a specific namespace, then the method 500 proceeds to block 518. At block 518, the controller determines whether the data parsing reveals data workload. If the controller determines that the data parsing reveals data workload, then the method returns to block 506. If the controller determines that data parsing does not reveal data workload, then the method proceeds to block 520. At block 520, the controller needs to make the best guess of how data will be read and the method 500 returns to block 506.

Figure 6:
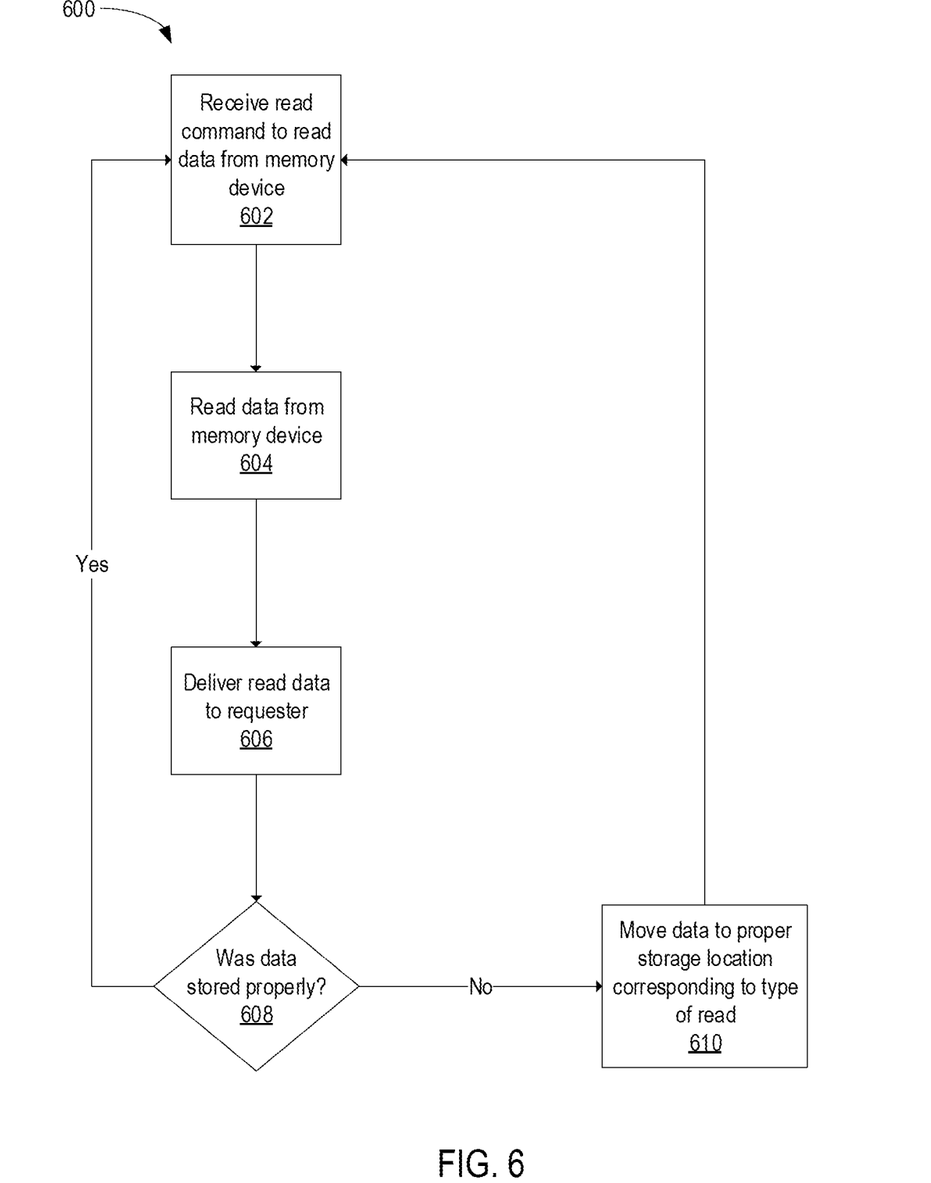
FIG. 6 is a flowchart illustrating a method for proper data storage corresponding to read type, according to certain embodiments.

FIG. 6 is a flowchart illustrating a method 600 for proper data storage corresponding to read type, according to certain embodiments. The method 600 begins at block 602. At block 602, the controller receives a read command to read data from memory device. At block 604, the controller reads data from the memory device. At block 606, the controller delivers read data to requester. At block 608, the controller determines whether the data was stored properly. If the controller determines that the data was stored properly, then the method 600 returns to block 602. If the controller determines that the data was not stored properly, then the method 600 proceeds to block 610. At block 610, the controller moves the data to a proper storage location corresponding to the type of read.

AIPR circuitry is expensive, and by selectively using AIPR circuitry for the same performance, the system is saving HW costs. There is improved device/system QoS because there is selective routing for random/sequential data to ensure faster retrieval. This is enhanced by using specialized (AIPR) HW circuitry.

In one embodiment, a data storage device comprises: a memory device, wherein the memory device has a first location for storing data expected to be randomly read and a second location for storing data expected to be sequentially read; and a controller coupled to the memory device, wherein the controller is configured to: receive a command to write data to the memory device; classify the data based upon whether the data is expected to be sequentially read or randomly read; and write the data to the memory device in either the first location or the second location based upon the classification. The first location is physically distinct from the second location. The first location comprises asynchronous independent plane read (AIPR) circuitry. The second location does not comprise AIPR circuitry. The controller is further configured to: receive a read command to read the data; determine that the data is incorrectly classified; and relocate the data to a different storage location. The relocation occurs during garbage collection (GC). The write command includes information on one or more of the following: stream identifier information; submission queue information; namespace location; and combinations thereof. The controller is configured to parse the data prior to writing the data to obtain workload information, and wherein the controller is configured to predict whether the data is expected to be sequentially read or randomly read based upon the parsing. The first location comprises one or more first solid state drives (SSDs) having asynchronous independent plane read (AIPR) circuitry, wherein the second location is one or more second SSDs that do not have AIPR circuitry, and wherein the one or more first SSDs and the one or more second SSDs are coupled to a third SSD. The controller is disposed in the third SSD.

In another embodiment, a data storage device comprises: a first solid state drive (SSD) having a controller; a second SSD coupled to the first SSD, wherein the second SSD comprises asynchronous independent plane read (AIPR) circuitry; and a third SSD coupled to the first SSD, wherein the third SSD does not include AIPR circuitry, and wherein the controller is configured to route data to the second SSD and the third SSD based upon a determination of whether the data will be sequentially read or randomly read. The controller is configured to perform the determination by parsing the data. The controller is configured to relocate the data upon determining that the data was written to an incorrect location. The controller is configured to: receive a write command to write data that will be read sequentially; and write the data to the third SSD. The controller is configured to: receive a write command to write data that will be read randomly; and write the data to the second SSD. The controller is configured to: determine that the data should be written sequentially; determine that the data will be read randomly; and write the data to the second SSD. The first SSD is connected to the second SSD using a controller memory buffer (CMB).

In another embodiment, a data storage device comprises: means to store data; and a controller coupled to the means to store data, wherein the configured to: determine whether data to be written to the means to store data will be sequentially read or randomly read; write the data to the means to store data in a location based upon the determining; determine that the data is improperly located based upon read characteristics; and relocate the data within the means to store data. The location is a first location, wherein the means to store data comprises a second location, and wherein the first location and the second location have different characteristics. The different characteristics are different circuitry.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a memory device, wherein the memory device has a first location for storing data expected to be randomly read and a second location for storing data expected to be sequentially read, wherein the first location comprises asynchronous independent plane read (AIPR) circuitry and the second location does not comprise AIPR circuitry; and
 a controller coupled to the memory device, wherein the controller is configured to:
  receive a command to write data to the memory device;
  determine whether data of the command is expected to be sequentially read or randomly read; and
  write data of the command to the memory device in either the first location or the second location based upon the determination, wherein:
   if the data is expected to be randomly read, the data is written to the first location; and
   if the data is expected to be sequentially read, the data is written to the second location.

2. The data storage device of claim 1, wherein the first location is physically distinct from the second location.

3. The data storage device of claim 1, wherein the controller is further configured to:
 receive a read command to read the data;
 determine that the data is incorrectly classified; and
 relocate the data to a different storage location.

4. The data storage device of claim 3, wherein the relocation occurs during garbage collection (GC).

5. The data storage device of claim 1, wherein the command includes information on one or more of the following:
 stream identifier information;
 submission queue information;
 namespace location; and
 combinations thereof.

6. The data storage device of claim 1, wherein the controller is configured to parse the data prior to writing the data to obtain workload information, and wherein the controller is configured to predict whether the data is expected to be sequentially read or randomly read based upon the parsing.

7. The data storage device of claim 1, wherein the first location comprises one or more first solid state drives (SSDs) having asynchronous independent plane read (AIPR) circuitry, wherein the second location is one or more second SSDs that do not have AIPR circuitry, and wherein the one or more first SSDs and the one or more second SSDs are coupled to a third SSD.

8. The data storage device of claim 7, wherein the controller is disposed in the third SSD.

9. A data storage device, comprising:
 a first solid state drive (SSD) having a controller;
 a second SSD coupled to the first SSD, wherein the second SSD comprises asynchronous independent plane read (AIPR) circuitry; and
 a third SSD coupled to the first SSD, wherein the third SSD does not include AIPR circuitry, and wherein the controller is configured to:
  receive a command to write data;
  determine whether data of the command is expected to be sequentially read or randomly read;
  route data of the command to the second SSD based upon the determination that the data is expected to be randomly read; and
  route data of the command to the third SSD based upon the determination that the data is expected to be sequentially read.

10. The data storage device of claim 9, wherein the controller is configured to perform the determination by parsing the data.

11. The data storage device of claim 9, wherein the controller is configured to relocate the data upon determining that the data was written to an incorrect location.

12. The data storage device of claim 9, wherein the controller is configured to:
 receive a write command to write data that will be read sequentially; and
 write the data to the third SSD.

13. The data storage device of claim 9, wherein the controller is configured to:
 receive a write command to write data that will be read randomly; and
 write the data to the second SSD.

14. The data storage device of claim 9, wherein the first SSD is connected to the second SSD using a controller memory buffer (CMB).

15. A data storage device, comprising:
 means to store data; and
 a controller coupled to the means to store data, wherein the controller is configured to:
  receive a command to write data to the means to store data;
  determine whether data of the command is expected to be sequentially read or randomly read;
  write the data to the means to store data in a location having asynchronous independent plane read (AIPR) means or a location without AIPR means based upon the determining, wherein:
   if the data is expected to be randomly read, the data is written to the location having AIPR means; and
   if the data is expected to be sequentially read, the data is written to the location without AIPR means;
  determine that the data is improperly located based upon read characteristics; and
  relocate the data within the means to store data.

16. The data storage device of claim 15, wherein the location is a first location, wherein the means to store data comprises a second location, and wherein the first location and the second location have different characteristics.

17. The data storage device of claim 16, wherein the different characteristics are different circuitry.

* * * * *